(12) United States Patent
Holmes et al.

(10) Patent No.: US 7,900,778 B2
(45) Date of Patent: Mar. 8, 2011

(54) APPARATUS AND METHOD FOR THE DETECTION AND REJECTION OF METAL IN PARTICULATE MATERIAL

(75) Inventors: George Holmes, Okotoks (CA); Robert LeClair, Fort McMurray (CA); Blair Jarvis, Calgary (CA)

(73) Assignee: Syncrude Canada Ltd., Fort McMurray (CA)

(*) Notice: Subject to any disclaimer, the term of this patent is extended or adjusted under 35 U.S.C. 154(b) by 0 days.

(21) Appl. No.: 12/263,330

(22) Filed: Oct. 31, 2008

(65) Prior Publication Data

US 2010/0108465 A1    May 6, 2010

(51) Int. Cl.
*B07C 5/00*    (2006.01)
(52) U.S. Cl. ............ 209/559; 209/567; 209/923
(58) Field of Classification Search .......... 209/559, 209/567, 571, 655, 657, 923
See application file for complete search history.

(56) References Cited

U.S. PATENT DOCUMENTS

| | | | | |
|---|---|---|---|---|
| 4,168,005 A | * | 9/1979 | Sandbank | 209/552 |
| 5,090,574 A | * | 2/1992 | Hamby | 209/552 |
| 5,236,093 A | * | 8/1993 | Marrs | 209/552 |
| 6,112,903 A | * | 9/2000 | Kimmel et al. | 209/11 |
| 6,669,000 B2 | * | 12/2003 | Wilson et al. | 198/367 |
| 6,727,452 B2 | * | 4/2004 | Schrader | 209/576 |
| 7,166,814 B2 | * | 1/2007 | Nakanishi et al. | 209/584 |
| 7,658,291 B2 | * | 2/2010 | Valerio | 209/559 |

FOREIGN PATENT DOCUMENTS

| | | |
|---|---|---|
| CA | 2021220 | 1/1992 |
| CA | 1317921 | 5/1993 |
| CA | 2183867 | 8/1995 |
| CA | 2480122 | 3/2006 |
| CA | 2520821 | 3/2007 |
| WO | WO 2007/120467 | 10/2007 |
| WO | WO 2008/015615 | 2/2008 |

* cited by examiner

*Primary Examiner* — Joseph C Rodriguez
(74) *Attorney, Agent, or Firm* — Bennett Jones LLP

(57) ABSTRACT

A system and method for removing a piece of tramp metal from particulate material transported by a conveyor is provided. A metal detector is used to detect tramp metal in the particulate material traveling along the conveyor. When a piece of tramp metal is detected, a redirection device positioned at the end of the conveyor is used to reject a portion of the particulate material that contains the tramp metal, by temporarily redirecting the flow of particulate material discharging from the conveyor. After the portion of particulate material containing the piece of tramp metal has been redirected by the redirection device, the system resumes normal operation.

13 Claims, 12 Drawing Sheets

APPARATUS AND METHOD FOR THE DETECTION AND REJECTION OF METAL IN PARTICULATE MATERIAL

The present invention relates to an apparatus and method for the removal of metal inclusions in a flow of particulate material traveling along a conveyor.

BACKGROUND OF THE INVENTION

In the mining industry, it is common for mined materials such as coal, oil sand, etc. to contain a certain amount of metallic scrap such as bucket teeth, crusher teeth, tools, etc. (commonly referred to as "tramp metal") that can cause damage to upstream equipment. Oil sand is a type of bitumen deposit typically containing sand, water and very viscous oil (the bitumen). When the oil sand deposit is located relatively close below the ground surface, the oil sand is often extracted from the deposit by mining. The oil sand is mined by excavating down through the ground surface to where the oil sand deposit occurs and removing oil sand from the deposit with heavy machinery.

Typically, this removal of the oil sand from the deposit is done with some of the largest power shovels and dump trucks in the world, with the power shovels removing shovel-loads of oil sand from the deposit and loading the collected oil sand onto conveyors to be carried away for further processing.

The viscous bitumen tends to hold the sand and water together causing the mined oil sand to contain lumps and chunks, some of which can be quite large. Because of the size of some of these pieces of mined oil sand, the mined oil sand is typically "pre-crushed" by running it through a preliminary crusher to crush the pieces of oil sand to a suitable size for transport on a conveyor (i.e. conveyable size).

The pre-crushed oil sand is then transported by conveyor to a slurry preparation unit as known in the art where the pre-crushed oil sand is further processed to form an oil sand and water slurry. One example of a slurry preparation unit is described in Canadian Patent Application No. 2,480,122, which unit comprises a series of roll crushers spread vertically throughout a portion of a slurry preparation tower. The slurry preparation tower typically uses gravity to move the oil sand through the tower. Typically, each roll crusher is made up of a number of crusher rolls spaced a set distance apart to reduce the size of large pieces of oil sand before the pieces of oil sand drop through the crusher rolls to the next roller crusher beneath or the bottom of the slurry preparation tower. Each successively lower roll crusher reduces the pieces of oil sand even smaller until the oil sand is fine enough to form a pumpable oil sand slurry.

At the same time the oil sand is passing though the different roll crushers, heated water is added to the oil sand to form it into a slurry. Typically, the stream of oil sand passing through the levels of roll crushers is sprayed with the heated water, as it passes down the tower. The mixing of this oil sand with the streams of hot water will form the eventual oil sand slurry, which is typically received in a pump box for feeding the slurry to a pump and pipeline system.

As long as only pre-crushed oil sand is being fed into a slurry preparation unit such as the aforedescribed slurry preparation tower, the slurry preparation unit operates properly. However, problems can occur when a piece of sizable metal (commonly called tramp metal) is present in the pre-crushed oil sand traveling along the conveyor. This tramp metal is often a piece of metal from machinery used earlier in the process, such as a piece of shovel tooth from the power shovel or a piece of crusher tooth from the primary crusher. If this piece of tramp metal is large enough, when it is fed into the slurry preparation tower along with a portion of oil sand, the tramp metal can damage or even jam one of the roll crushers used in the slurry preparation tower. With the roll crushers damaged or jammed, the entire process has to be stopped while the crusher rolls are either repaired or the jam is located and the tramp metal removed. This can lead to lengthy outages to remove the object from the crusher rolls and affect repairs if any damage has occurred.

Unfortunately, this inclusion of tramp metal in the pre-crushed oil sand often occurs quite frequently, with occurrences of tramp metal in a flow of pre-crushed oil sand having been seen as frequently as once per 12 hours shift.

Previously a complex system of screens has been used to locate and remove this tramp metal from the process. However, these systems greatly complicated the process because they added a number of additional steps that could limit the amount of oil sand that was processed. Additionally, because of the conditions they were operating under, the screens often had relatively low operation lives, requiring frequent repairs and replacements. Most modern processes have completely removed the screens from the system and instead rely on metal detectors to locate pieces of tramp metal in the oil sand.

Metal detectors are now commonly used to locate tramp metal in the flow of pre-crushed oil sand along a conveyor. When the metal detector detects a piece of tramp metal in the oil sand, the metal detector either alerts an operator that metal has been detected in the flow of pre-crushed oil sand or sends a signal stopping the conveyor and preventing the tramp metal from being fed into the slurry preparation tower. Once the conveyor is stopped, someone is sent out to locate the tramp metal and remove it from the pre-crushed oil sand.

However, the detection of tramp metals in the flow of oil sand is far simpler than the eventual locating and removal of the tramp metal from the oil sand once the conveyor is stopped. The oil sand on the conveyor can be 1-2 feet in depth, burying the often relatively small tramp metal. Additionally, because of the delay in time between the receipt of the alert from the metal detector and the stopping of the conveyor, the tramp metal will often vary in distance downstream from the metal detector, making it guess work for a person to figure out where along the length of pre-crushed oil sand the tramp metal lies. The conveyor carrying the oil sand can be hundreds of meters long or more, requiring a conveyor belt twice as long as the distance covered by the conveyor. During operation the conveyor belt is commonly driven at speeds between 3-4 meters per second. The significant weight of the belt, as well as its speed, results in the moving belt having significant inertia often requiring substantial force and a significant period of time for the conveyor belt to be decelerated and stopped. This can make the estimating of the position of the tramp metal buried in the oil sand on the belt less than precise for the human operators. Additionally, there are numerous factors with the conveyor, such as wear on bearing and the engine driving the conveyor belt, that can make the deceleration time to stop the belt vary over the life of the conveyor.

Not only does it take time to decelerate and halt the conveyor and then restart and accelerate the conveyor back up to the desired operating speed, because of the force required to decelerate and accelerate the conveyor, frequently stopping the conveyor can increase the wear on the conveyor and its components, impacting the lifespan of the conveyor.

Additionally, the affects of halting the conveyor and stopping the flow of oil sand into the slurry preparation tower are not as simple as temporarily delaying the process. The processing of oil sand is commonly done as a continuous process. Stopping the conveyor can not only affect all later steps of the process, it can also affect the quality of the formed slurry. The slurry preparation tower requires a relatively consistent feed rate of oil sand to result in a high quality oil sand slurry having a consistent density. It is known that conditioning of oil sand slurry (e.g., release of bitumen flecks, attachment of bitumen flecks to air bubbles, etc.) is most efficient within a relatively narrow density range resulting from a proper ratio of oil sand to water in the slurry. Interrupting the supply of particulate oil sand to the slurry preparation tower can reduce the quality of the slurry, reducing the effectiveness of later process steps or even rendering a slurry unusable. In addition to the interruption, the time needed for the deceleration of the conveyor when the conveyor is being stopped to remove the tramp metal can result in oil sand slurry with a diminishing density as the flow rate of oil sand entering the slurry preparation tower decreases with the deceleration of the conveyor. When the conveyor is being sped up again, the time needed to accelerate the conveyor up to speed can also result in variations in the density of the resulting slurry.

There is therefore a need to remove pieces of tramp metal from a flow of particulate material such as oil sand being moved on a conveyor without halting the flow of same for a significant period of time.

SUMMARY OF THE INVENTION

In a first aspect, a system for rejecting a portion of non-metallic particulate material containing a piece of tramp metal is provided. The system comprises: a conveyor having a discharge end, the discharge end positioned to discharge particulate material from the conveyor to an intake opening; a metal detector positioned adjacent to the conveyor and upstream a travel distance from the discharge end; a redirection device provided at the discharge end of the conveyor, the redirection device operative to allow particulate matter discharging from the discharge end of the conveyor to enter the intake opening and, when activated, redirect particulate material discharged from the discharge end of the conveyor away from the intake opening; and a controller comprising at least one processor. The at least one processor is operative to: in response to receiving a metal detected signal from the metal detector, the metal detected signal indicating that the metal detector has detected a piece of metal in the particulate material traveling along the conveyor, determine a travel time for the piece of metal to reach the discharge end of the conveyor; and activate the redirection device to redirect particulate material discharged from the discharge end of the conveyor away from the intake opening at the travel time.

In another aspect, a method for rejecting a portion of non-metallic particulate material containing a piece of tramp metal traveling along a conveyor discharging to an intake opening is provided. The method comprises: detecting a piece of metal in particulate material carried by the conveyor; determining a travel time indicating when the piece of metal will be discharged from the conveyor; and directing particulate material being discharged from the conveyor away from an intake opening for a discharge time and then redirecting the particulate matter being discharged from the conveyor to the intake opening after the discharge time, wherein the travel time occurs within the discharge time.

In another aspect, an apparatus for controlling a system to automatically remove a piece of tramp metal from particulate matter transported by a conveyor discharging into an intake opening is provided. The apparatus comprises: at least one processor operative to: in response to receiving a metal detector signal from a metal detector indicating a piece of metal has been detected a portion of particulate material traveling along the conveyor, determine a travel time for the piece of metal to reach a discharge end of the conveyor; and using the travel time, generate at least one signal and transmitting the at least one signal to a redirection device to cause the redirection device to divert particulate material discharging from the conveyor away from the intake opening for a discharge time.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
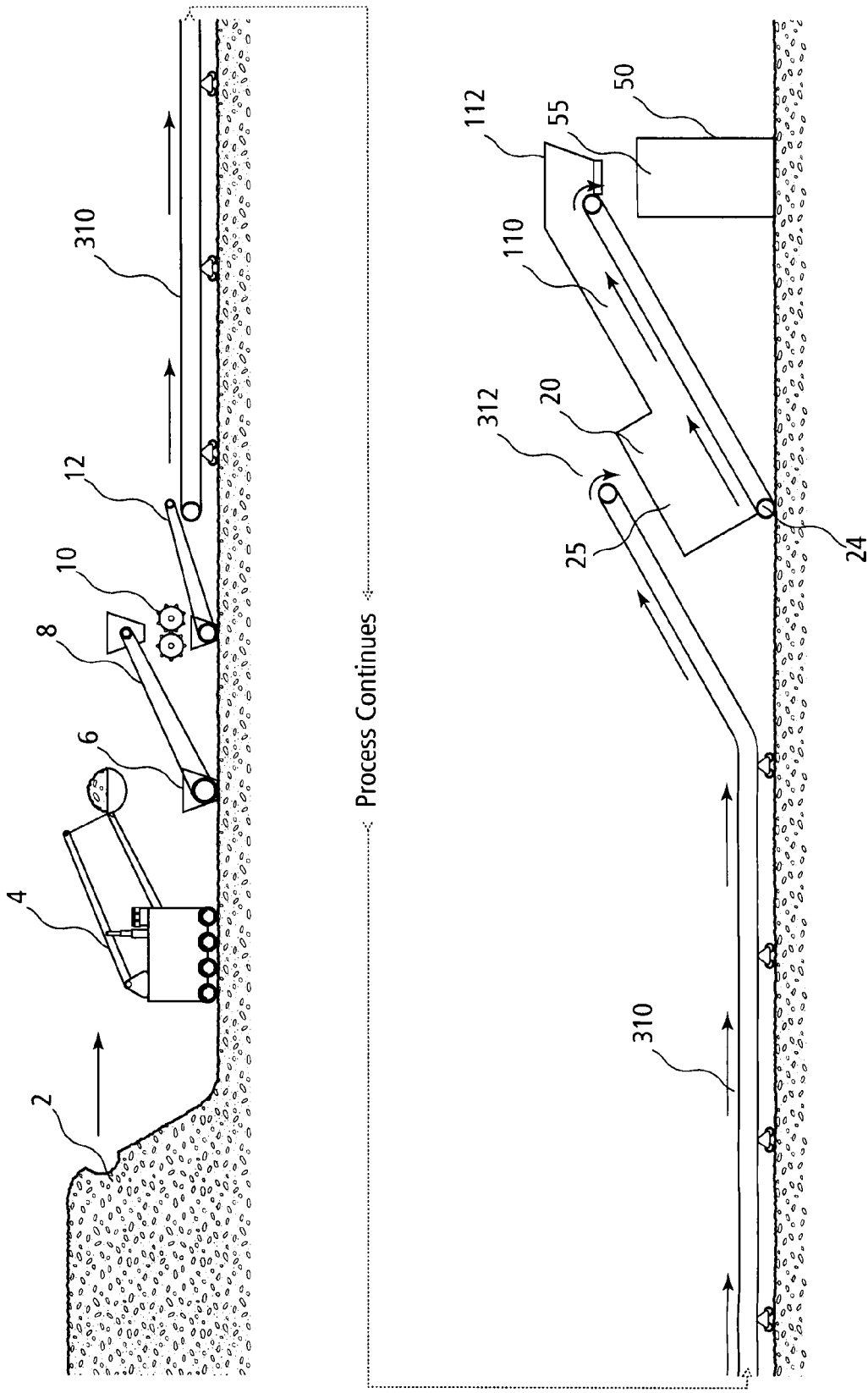
FIG. 1 is a schematic illustration of a process for forming a pumpable oil sand and water slurry.

FIG. 1 illustrates a process wherein oil sand is mined and then processed to form an oil sand slurry ready for hydrotransport (pumpable oil sand slurry). Oil sand mined from an oil sand deposit 2 by a power shovel 4 is fed into a hopper 6 of a preliminary conveyor 8. The preliminary conveyor 8 deposits a flow of the mined oil sand into a preliminary (or primary) crusher 10 that reduces the size of the mined oil sand to pieces of conveyable size (pre-crushed oil sand). From the preliminary crusher 10 the pre-crushed oil sand is fed to a transport conveyor 310, using a loading conveyor 12, where the particulate oil sand is transported along the transport conveyor 310 to a discharge end 312 of the transport conveyor 310. At the discharge end 312 of the transport conveyor 310, the pre-crushed oil sand is discharged through an intake opening 25 of a surge bin 20, where it is eventually carried up a conveyor 110 and discharged into an intake opening 55 of the slurry preparation tower 50. The slurry preparation tower 50 takes the flow of particulate oil sand discharging from a discharge end 112 of the conveyor 110 and processes the flow of particulate oil sand to form an oil sand slurry.

The length of the transport conveyor 310 will vary depending on the distance of the preliminary crusher 10 from the slurry preparation tower 50, but in many cases the transport conveyor 310 is hundreds of meters in length.

Figure 2:
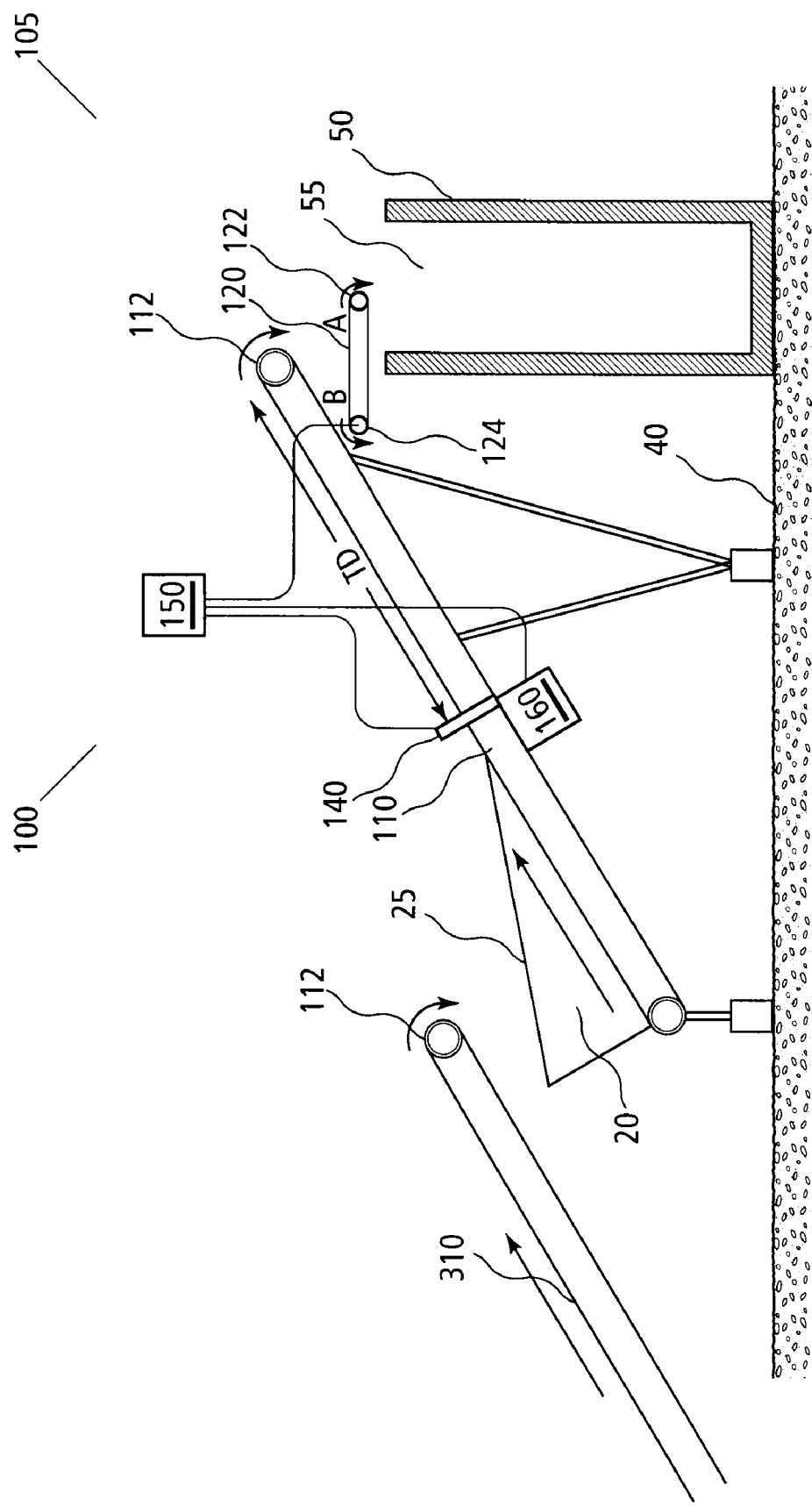
FIG. 2 is a schematic illustration of a system, in a first aspect, for detecting a piece of metal in particulate oil sand being carried along a conveyor and rejecting a portion of the particulate oil sand containing the piece of metal.

FIG. 2 is a schematic illustration of a system 100 in a first aspect. The system 100 supplies a flow of particulate oil sand to the slurry preparation tower 50, where the oil sand will be further crushed and slurried with water to form a pumpable oil sand slurry for further processing. The system 100 comprises: a first conveyor 110; a redirecting device 105 having a second conveyor 120; a metal detector 140; and a control device 150.

The first conveyor 110 transports a flow of particulate oil sand along a length of the first conveyor 110 towards a discharge end 112 of the first conveyor 110. The discharge end 112 is provided generally above an intake opening 55 of the slurry preparation tower 50.

The redirection device 105 comprises a second conveyor 120. The second conveyor 120 is provided below the discharge end 112 so that a flow of particulate oil sand being discharged from the discharge end 112 of the first conveyor 110 lands on the second conveyor 120. The second conveyor 120 is bi-directional so that the second conveyor 120 can be driven to carry material along the second conveyor 120 either in a first direction, A, or a second direction, B. The second conveyor 120 is positioned so that particulate oil sand moved by the second conveyor 120 in the first direction, A, and discharged from a first end 122 of the second conveyor 120 will drop into the intake opening 55 of the slurry preparation tower 50. A second end 124 of the second conveyor 120 is positioned so that particulate oil sand moved by the second conveyor 120 in the second direction, B, and discharged from the second end 124 of the second conveyor 120 will not fall into the intake opening 55 of the slurry preparation tower 50. In an aspect, the second end 124 of the second conveyor 120 is positioned so that oil sand discharged off of the second end 124 of the second conveyor 120 falls to a ground surface, 40, beside the slurry preparation tower 50.

The metal detector 140 is positioned along the first conveyor 110 a travel distance, TD, from the discharge end 112 of the first conveyor 110. The metal detector 140 can detect a piece of metal in the flow of particulate oil sand traveling along the first conveyor 110 past the metal detector 140.

Figure 12:
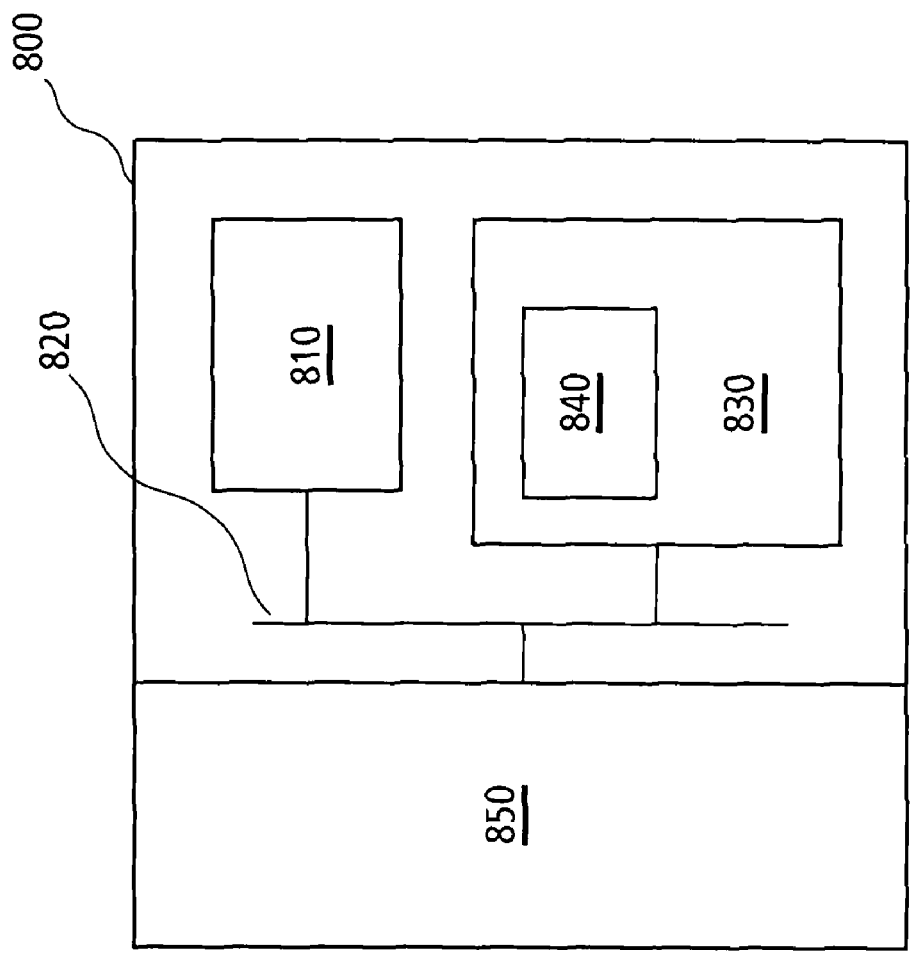
FIG. 12 is a schematic illustration of a data processing system for use as a controller in one aspect.

The controller 150 is operatively connected to the metal detector 140 and the second conveyor 120. The controller 150 could be a computer, a programmable logic controller (PLC), etc. operative to receive and transmit signals to control the operation of the system 100, such as the data processing device 800 shown in FIG. 12. The data processing device 800 includes a processor 810, system buses 820, memory 830 containing program instructions 840 and an I/O interface 850.

The processor 810 is a central processing unit that is typically microprocessor based to implement the program instructions 840 and control the operation of the data processing device 800. The system buses 820 allow the transmissions of digital signals between the various components of the data processing device 800. The memory 830 stores the operating system, data needed for the operation of the data processing device and the program instructions 840. Typically, the memory 830 will contain RAM for data and an EPROM or Rom for storing the operating system and program instructions 840. The I/O interface 850 allows for the connection to remote components to receive signals from remote components and transmit signals to the remote components. A person skilled in the art will appreciate that the data processing system 800 will also include components, such as a power supply, in addition to those illustrated in FIG. 8.

Referring again to FIG. 2, the controller 150 is operatively connected to the metal detector 140 so that the controller 150 can receive a metal detected signal from the metal detector 140 when the metal detector 140 detects a piece of metal in the flow of particulate oil sand traveling along the first conveyor 110. The controller 150 is operatively connected to the second conveyor 120 so that the controller 150 can control the direction of the second conveyor 120. In an aspect, the controller 150 is operatively connected to a speed sensing device 160, such as a pulley mounted speed encoder, to obtain a speed of the first conveyor 110.

Figure 3:
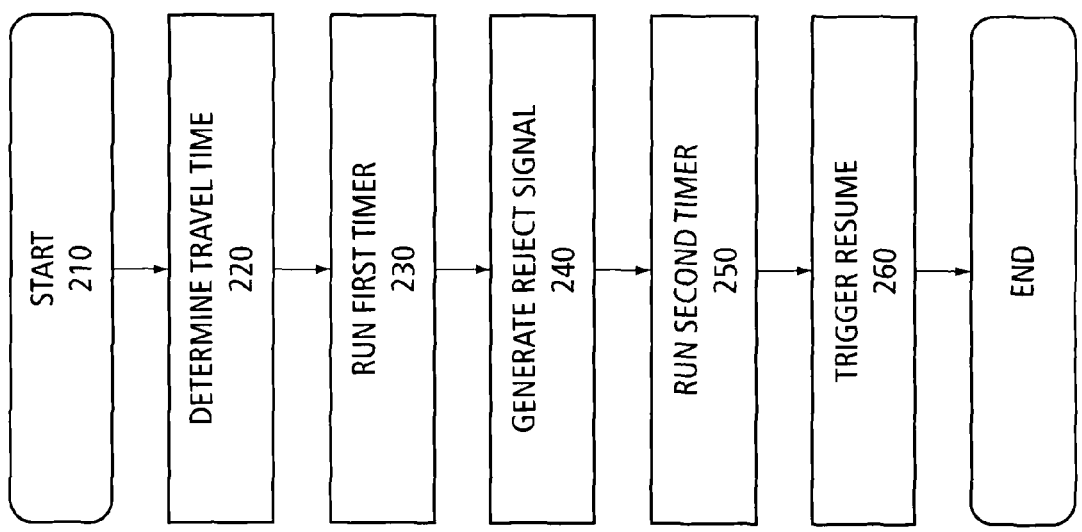
FIG. 3 is a flowchart illustrating a method performed by an embodiment of a controller.

FIG. 3 is a flowchart illustrating a method 200 used by the controller 150, in FIG. 2, to control the system 100. The method 200 comprises the steps of: determining a travel time 220; running a first timer 230; generating a reject signal 240; running a second timer 250; and triggering a resume signal 260.

Referring to FIGS. 2 and 3, method 200 is started at step 210 when the controller 150 receives a metal detected signal from the metal detector 140, indicating that a piece of metal has been detected in the flow of particulate oil sand traveling along the first conveyor 110.

At step 220, a travel time for the piece of metal detected by the metal detector 140 to reach the discharge end 112 is determined. The travel time is determined based on the travel distance, TD, of the metal detector 140 from the discharge end 112 of the first conveyor 110 and the operating speed of the first conveyor 110. The travel distance, TD, provides the distance the piece of metal will have to travel after it has passed the metal detector 140 before it reaches the discharge end 112 of the first conveyor 110. The operating speed of the first conveyor 110 indicates the speed at which the metal object and the oil sand are being carried along the first conveyor 110. The operating speed of the first conveyor 110 could be obtained by the controller 150 by having the first conveyor 110 maintain a constant operating speed, however, because the travel distance, TD, can be quite long and the travel time relatively long (more than a minute) it might be desirable to obtain the operating speed of the conveyor belt 110 directly from the speed sensing device, 160, or from a device controlling the speed of the first conveyor belt 110.

At step 230, the method 200 runs a first timer for a period of time equal to the travel time minus a buffer time.

At step 240, after the first timer has been run, a reject signal is generated from the controller 150 to the second conveyor 120. Step 240 is performed by the controller 150 after the first timer is run. The first timer runs for a period of time equal to the travel time determined at step 220, for the piece of metal to reach the discharge end 112 of the first conveyor 110 less a buffer time. The buffer time is a short period of time used so that a reject signal is generated by the controller 150, at step 240, before the piece of metal is discharged from the discharge end 112 of the first conveyor 110. The buffer time can allow enough time for the direction of operation of the second conveyor 120 to be reversed before the particulate oil sand containing the piece of metal falls onto the second conveyor 120, so that the second conveyor 120 is already operating in the second direction, B, by the time the piece of metal lands on the second conveyor 120. The buffer time can also be used to account for inaccuracies in the travel time determined at step 220 and delays in the transmission of the reject signal by increasing the buffer timer to have the reject signal transmitted earlier.

The travel time is use to determine when the piece of metal detected by the metal detector 140 has traveled along the first conveyor 110 to the discharge end 112 of the first conveyor 110. Before the piece of metal is discharged off the discharge end 112 of the first conveyor 110, the controller 130 transmits the reject signal to the second conveyor 120.

When the second conveyor 120 receives the reject signal from the controller 150, the second conveyor 120 reverses its direction of travel, moving material on the second conveyor 120 in the direction, B, carrying particulate oil sand discharged onto the second conveyor 120, from the first conveyor 110, off the second end 124 of the second conveyor 120 so that the oil sand does not fall into the intake opening 55 of the slurry preparation tower 50 and into the number of crusher rolls (not shown) contained in the slurry preparation tower 50.

At step 250, a second timer is run for a discharge time. The discharge time will be based on the length of the second conveyor 120 and the time required for particulate material landing on the second conveyor 120 from the first conveyor 110 to be carried off the second end 124 of the second conveyor 120 and how quickly the direction of operation of the second conveyor 120 can be reversed. Typically, this time is less than one (1) minute with times of ten (10) seconds or less being possible to reduce the time the flow of particulate oil sand is stopped.

After the second timer has run for the discharge time, the method 200 proceeds to step 260 and a resume signal is transmitted. The controller 150 generates a resume signal and transmits it to the second conveyor 120 causing the second conveyor 120 to once again change the direction and resume normal operation. The second conveyor 120 reverses the direction of travel from the second direction, B, back to the first direction, A, causing particulate oil sand discharged from the first conveyor 110 onto the second conveyor 120 to once again be discharged off the first end 122 of the second conveyor 120 and into the intake opening 55 of the slurry preparation tower 50.

With step 260 completed, the system 100 is once again operating under normal conditions delivering a flow of particulate oil sand to the slurry preparation tower 50 and the method 200 ends.

The method 200 will be invoked again if the metal detector 140 determines that there is another piece of metal in the particulate oil sand traveling along the first conveyor 110.

In this manner, when the system 100 detects a piece of metal in the oil sand traveling along the first conveyor 110, the system 100 approximates when the piece of metal will reach the discharge end 112 of the first conveyor 110 and be discharged from the first conveyor 110. Shortly before the piece of metal is discharged off the first conveyor 110, the direction of travel of the second conveyor 120 is reversed so that particulate oil sand on the second conveyor 120 is rejected from the system 100 by the second conveyor 120. The reversal of direction of the second conveyor 120 discharges a portion of particulate oil sand off the second end 124 of the second conveyor 120, preventing the portion of particulate oil sand from entering the slurry preparation tower 50. During this time, the piece of metal is discharged off the discharge end 112 of the first conveyor 110, onto the second conveyor 120, where it is rejected from the system. After a relatively short period of time, sufficient for the portion of particulate oil sand containing the piece of metal to be discharged off the second conveyor 120, the direction of the second conveyor 120 is once again reversed and oil sand discharged from the first conveyor 110 to the second conveyor 120 is once again fed into the intake opening 55 of the slurry preparation tower 50.

Although a portion of the oil sand is rejected along with the piece of metal, the amount of time the flow of oil sand entering the slurry preparation tower 50 is halted is relatively short, only the short period of time for the piece of metal to be discharged off the end of the first conveyor 110 onto the second conveyor 120, and then discharged off the second end 124 of the second conveyor 120. This short period of time is based on the length of the second conveyor 120. The shorter the second conveyor 120 and the faster the short conveyor 120 can change its direction of operation, the shorter the short period of time can be.

Because only the operation of the second conveyor 120 is affected, the first conveyor 110 can be operated at a constant speed of operation throughout the operation of the method 200. Stopping the first conveyor 110 or even altering the speed of first conveyor 110 requires significantly more force and time than stopping or altering the direction of motion of the second conveyor 120 because of the greater inertia of the moving much larger conveyor belt of the first conveyor 110. Once the first conveyor 110 is stopped, significant force is also required to get the first conveyor 110 back up to operating speed. This can significantly impact the slurrying of the oil sand, because the slurry preparation is a continuous process. This continuous process is affected by the slowing down of the first conveyor 110 because this alters the flow rate of particulate oil sand entering the slurry preparation tower 50, which can result in variations in density of the resulting oil sand slurry. The process is also interrupted for the duration of the time the first conveyor 110 is stopped because there is no particulate oil sand entering the slurry preparation tower 50 while the first conveyor 110 has stopped operating. Finally, starting the first conveyor 110 up again, after the interruption, requires the first conveyor 110 to be accelerated back up to operating speed, which again requires some time, resulting in an uneven flow rate of particulate oil sand entering the slurry preparation tower 50 during this period, until the first conveyor 110 once again achieves operating speed.

Because the second conveyor 120 is significantly shorter than the first conveyor 110, altering the speed of the second conveyor 120 is much easier, requiring much less force and time than the first conveyor 110 to bring the second conveyor 120 up to operating speed. Because the first conveyor 110 can be operated at a constant operating speed while the direction of the second conveyor 120 is reversed, the flow rate of particulate oil sand being discharged from the first conveyor 110 onto the second conveyor 120 remains constant, resulting in a more constant flowrate of particulate oil sand being delivered to the slurry preparation tower 50.

Figure 4:
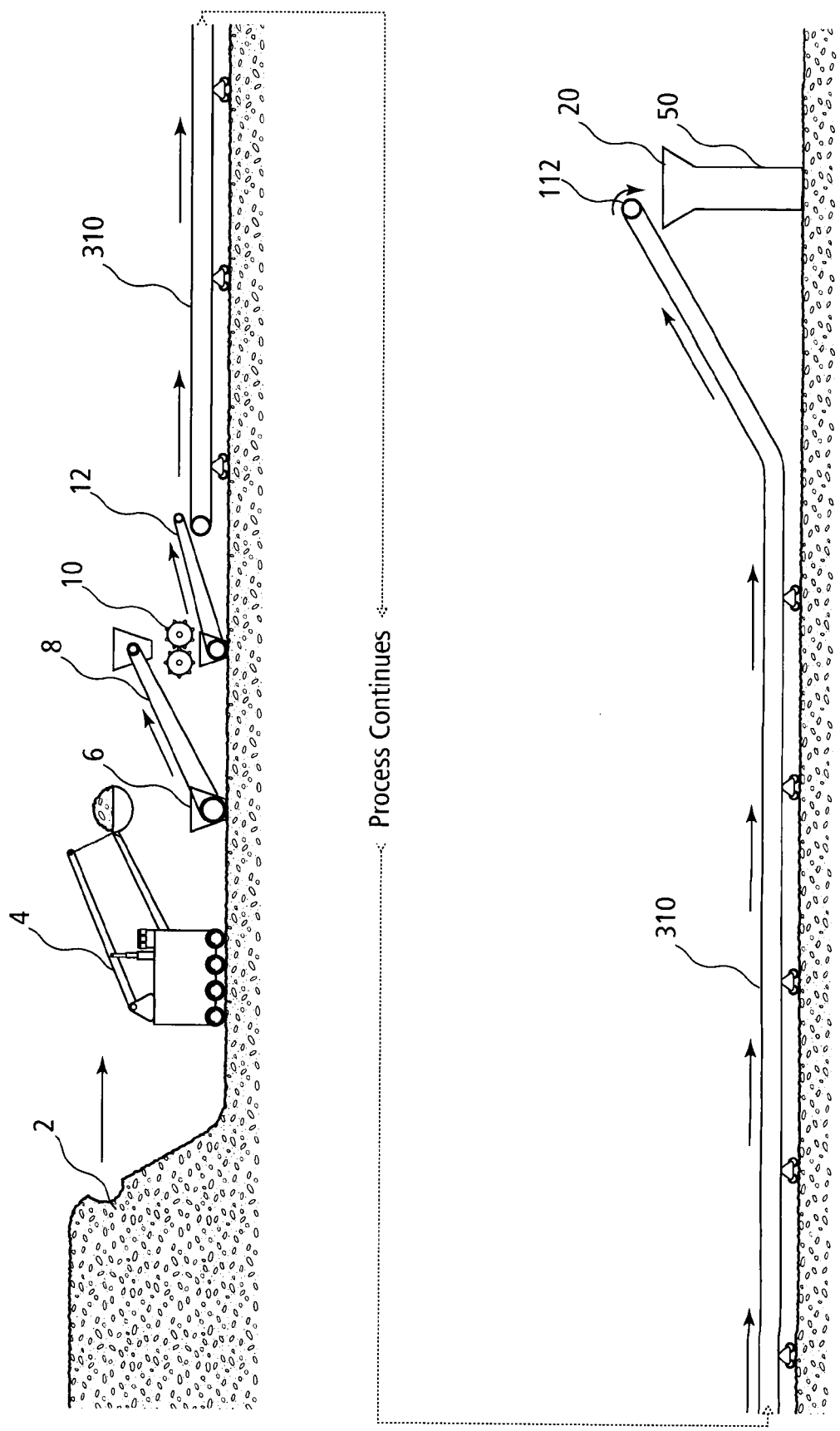
FIG. 4 is a schematic illustration of a process for forming a pumpable oil sand and water slurry wherein a surge bin is used.

In some aspects, the surge bin 20 may not be used. FIG. 4 is a schematic illustration of a variation of a process for taking mined oil sand and forming an oil sand slurry from the mined oil sand. This process is similar to the process shown in FIG. 1, with the exception that the surge bin 20 and the conveyor 110 are not used. Instead, the transport conveyor 310 discharges directly into the intake opening 55 of the slurry preparation tower 50. The system 100 shown in FIG. 2 can be used with the transport conveyor 310, when the transport conveyor 310 is discharging directly into the slurry preparation tower 50. The metal detector 140 can be placed at a point along the length of the transport conveyor 310.

With the transport conveyor 310 discharging directly into the slurry preparation tower 50, the difference in size between the transport conveyor 310 and the second conveyor 120 is even greater. The transport conveyor 310 may be quite long in aspects where it has to carry particulate oil sand from a preliminary crushing stage to the slurry preparation tower 50, while the second conveyor 120 is much shorter than the transport conveyor 310. In some instances, the transport conveyor 310 can be five hundred (500) meters long or more, requiring more than a kilometer of conveyor belt. Because of this, the forces required to slow down and stop the transport conveyor 310 are much greater than those required to alter the direction of motion of the second conveyor 120. Additionally, to once again get the transport conveyor 310 up to a desired operating speed after the transport conveyor 310 is stopped, significant force and time is required to accelerate the transport conveyor 310 back to the desired operating speed. These variations in speed and stopping time can significantly affect the slurrying process.

Figure 5:
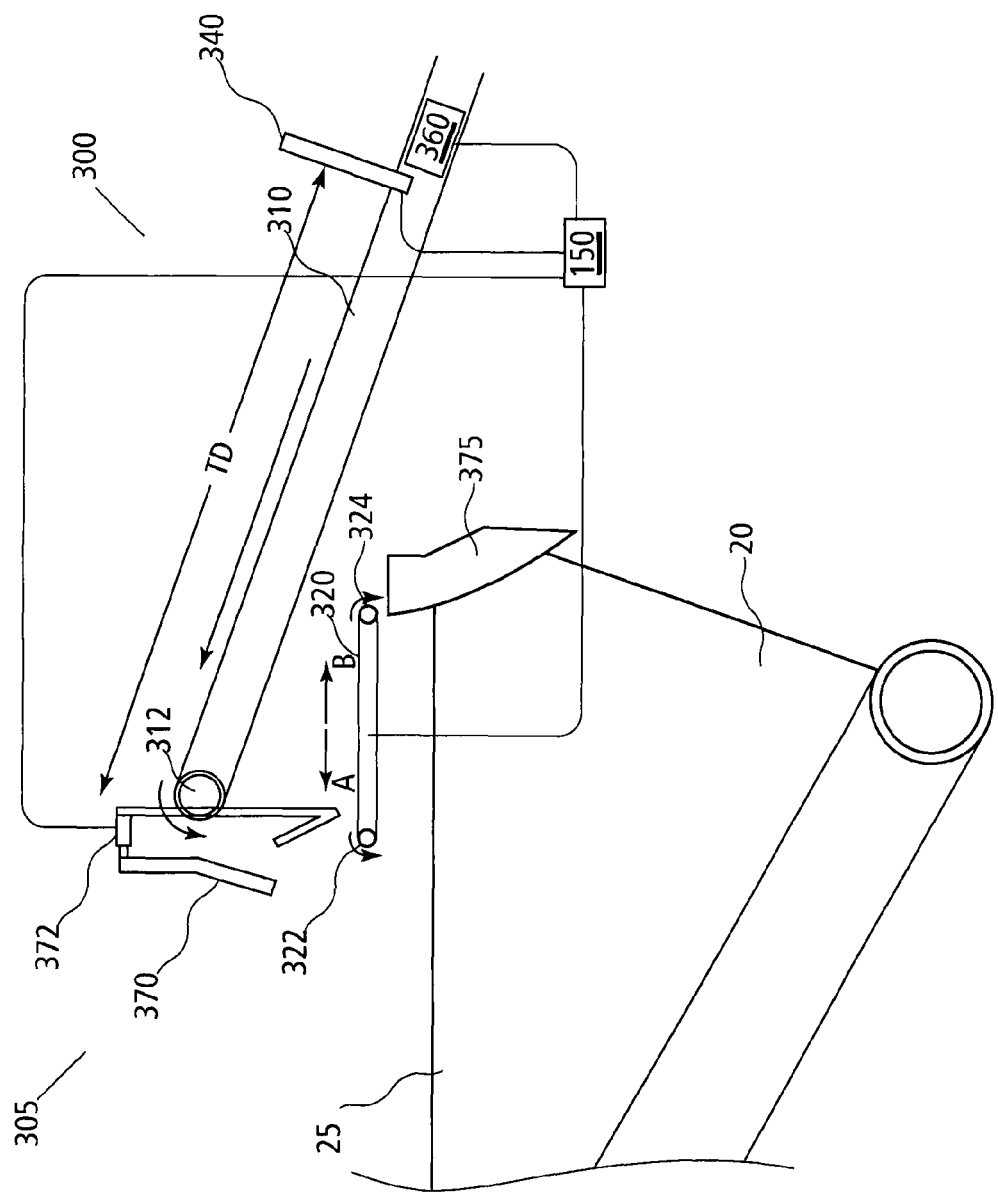
FIG. 5 is a schematic illustration of a system, in a further aspect, for detecting a piece of metal in particulate oil sand carried along a conveyor and rejecting a portion of the particulate oil sand containing the piece of metal, using a baffle wall.
Figure 6:
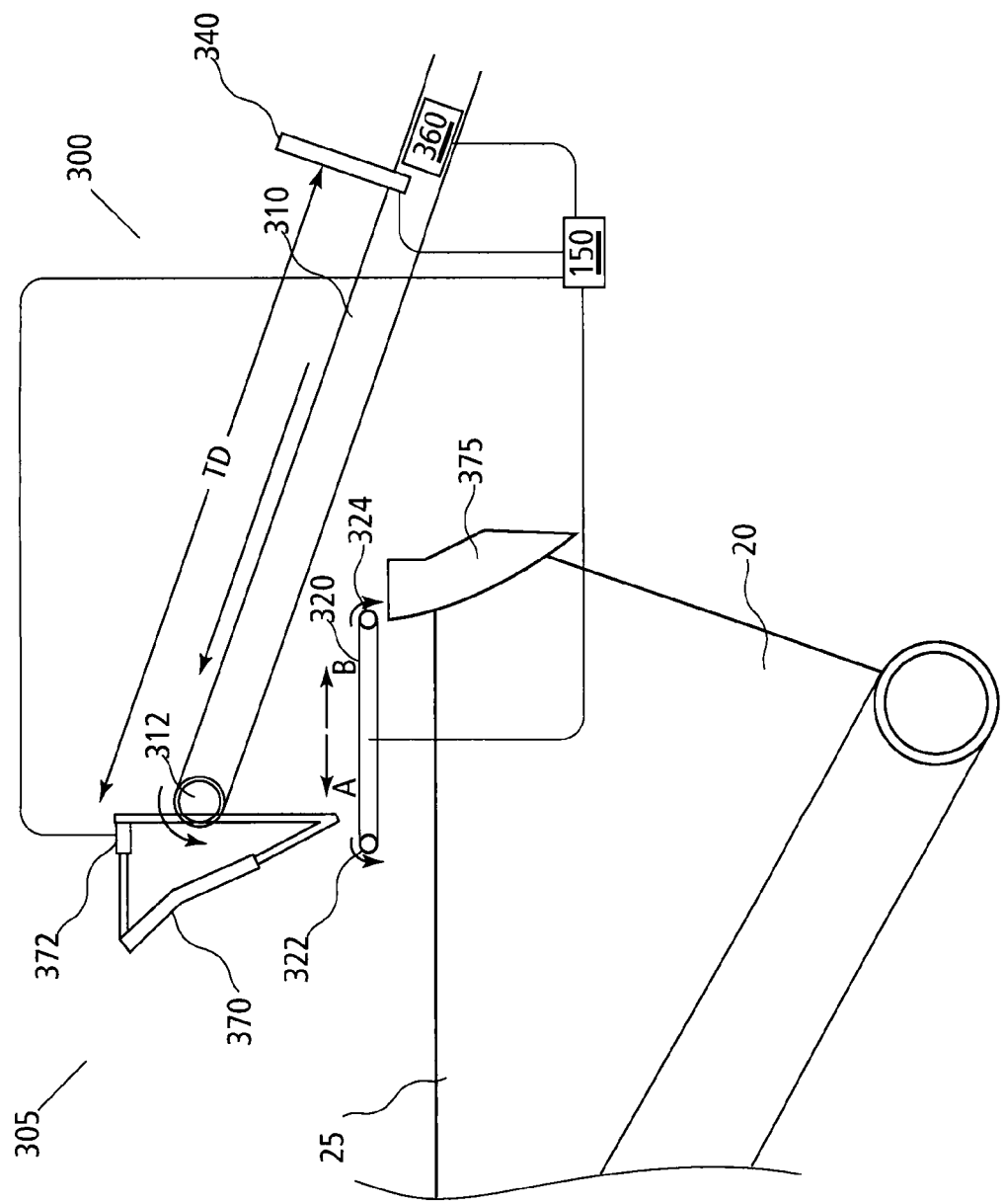
FIG. 6 is a schematic illustration of the system shown in FIG. 5 with the baffle wall in a second position.

Referring again to FIG. 1, even when the surge bin 20 and the conveyor 110 are used, in some cases it may be desirable to reject a piece of metal from the transport conveyor 310, rather than the conveyor 110. FIGS. 5 and 6 are schematic illustrations of a system 300 in a further aspect. Because the conveyor 310 does not discharge directly into the slurry preparation tower 50, but rather into the surge bin 20, system 300 has to be modified from system 100, shown in FIG. 2 to take into account this difference. The system 300 comprises: a first conveyor 310; a redirection device 305, including a second conveyor 320 and a baffle wall 370; a chute 375; a metal detector 340; and a controller 150.

The first conveyor 310 has a discharge end 312. Particulate oil sand traveling along the first conveyor 310 is discharged from the first conveyor 310 at the discharge end 312 of the first conveyor 310.

The redirection device 305 is provided at the discharge end 312 of the conveyor 310. The second conveyor 320 is positioned below the discharge end 312 of the first conveyor 310. The second conveyor 320 is bi-directional so that it can be operated in a first direction, A, or a second direction, B. A first end 322 of the second conveyor 320 is positioned so that material discharged from the first end 322 of the second conveyor 320, when the second conveyor 320 is operating in the first direction, A, falls into the intake opening 25 of the surge bin 20. The second end 324 of the second conveyor 320 is positioned so that material discharged from the second end 324 of the second conveyor 320 is discharged to the chute 375 and the chute 375 directs the material away from the intake opening 25 of the surge bin 20.

The baffle wall 370 is positioned relative to the discharge end 312 and can be moved between a first position and a second position. In the first position, as shown in FIG. 5, the baffle wall 370 allows particulate oil sand being discharged from the discharge end 312 of the first conveyor 310 to fall into the intake opening 25 of the surge bin 20, with any of the particulate oil sand falling on the second conveyor 320 being carried in the first direction, A, by the second conveyor 320, until the particulate oil sand is discharged off the first end 322 of the second conveyor 320 into the intake opening 25 of the surge bin 20. With the baffle wall 370 placed in the second position, as shown in FIG. 6, the baffle wall 370 deflects all of the particulate oil sand discharging from the discharge end 312 of the first conveyor 310 towards the second conveyor 320.

Typically, a hydraulic cylinder 372 is used to move the baffle wall 370 between the first position and the second position.

The metal detector 340 is positioned a travel distance, TD, upstream from the discharge end 312 of the first conveyor 310. The metal detector 340 can detect a piece of metal passing by the metal detector on the first conveyor 310.

The controller 150 is operatively connected to the metal detector 340, the baffle wall 370 (specifically the hydraulic cylinder 372), the second conveyor 320 and optionally a speed determining device 360.

The controller 150 could be a computer, programmable logic controller, etc. operative to control the operation of the system 300. The controller 150 is operatively connected to the metal detector 340 to receive metal detected signals from the metal detector 340 when the metal detector 340 detects a piece of metal passing the metal detector 340 on the first conveyor 310. The controller 150 is operatively connected to the hydraulic cylinder 372 and the second conveyor 320 so that the controller 150 can transmit reject signals and resume signals to the hydraulic cylinder 372 and the second conveyor 320.

In response to receiving a reject signal from the controller 150, the second conveyor 320 reverses its direction of operation from the first direction, A, with the second conveyor 320 discharging into the intake opening 25 of the surge bin 20, to the second direction, B and the hydraulic cylinder 372 moves the baffle wall 370 from the first position (shown in FIG. 5) to the second position (shown in FIG. 6). In this manner, particulate oil sand discharging from the first conveyor 310 is directed away from the intake opening 25 of the surge bin 20, so that a portion of the particulate oil sand is prevented from entering the surge bin 20 and continuing through the process.

In response to receive a resume signal, the second conveyor 320 reverses its direction of operation back to the first direction, A, and the hydraulic cylinder 372 moves the baffle wall 370 back to the first position (shown in FIG. 5) and the system 300 resumes normal operation, continuing to transport a flow of particulate oil sand to the slurry preparation tower 50.

Referring to FIGS. 3, 5 and 6, the controller 150 uses the method 200 illustrated in FIG. 3 to control the operation of the system 300 when a piece of metal is detected by the metal detector 340.

Method 200 begins at step 210 when controller 150 receives a metal detected signal from the metal detector 340. At step 220, the controller 150 determines a travel time for the piece of metal to travel the travel distance, TD, along the first conveyor 310 from the metal detector 340 to the discharge end 312.

Using the travel time determined at step 220, the controller 150 runs a first timer for a timer period equal to the travel time minus a buffer time. When the first timer ends, a reject signal is generated and transmitted to the hydraulic cylinder 372 and the second conveyor 320 at step 240.

Upon receiving the reject signal from the controller 150, the hydraulic cylinder 372 is activated, moving the baffle wall 370 from the first position (as shown in FIG. 5) to the second position (as shown in FIG. 6). With the baffle wall 370 moved to the second position, particulate oil sand discharging from the discharge end 312 of the first conveyor 310 is deflected to the second conveyor 320. When the second conveyor 320 receives the reject signal transmitted by the controller 150, the direction of operation of the second conveyor 320 is reversed from the first direction, A, to the second direction, B, causing particulate matter landing on the second conveyor 320 to be moved in the second direction, B, and off the second end 324 of the second conveyor 320 into the chute 375.

After step 240, any particulate oil sand discharged from the discharge end 312 of the first conveyor 310 is deflected by the baffle wall 370 to the second conveyor 320. Once on the second conveyor 320, the oil sand is carried to the second end 324 of the second conveyor 320 where the chute 375 directs the particulate oil sand away from the intake opening 25 of the surge bin 20. In this manner, the system 300 temporarily directs a portion of the particulate oil sand flow being discharged from the discharge end 312 of the first conveyor 310 away from the intake opening 25 of the surge bin 20, removing this portion of oil sand containing a piece of metal from the process of creating an oil sand slurry and preventing the piece of metal contained within the portion of particulate oil sand flow from carrying on through later steps in the process.

At step 240, the controller 150 runs a second timer for a discharge time and after the second timer has run for the discharge time, step 250 is performed and a resume signal transmitted by the controller 150 to the hydraulic cylinder 372 and the second conveyor 320. Upon receiving the resume signal, the hydraulic cylinder 372 moves the baffle wall 370 from the second position (as show in FIG. 6), where the baffle wall 370 is deflecting the particulate matter discharging from the discharge end 312 of the first conveyor 310 towards the second conveyor 320, back to the first position (as shown in FIG. 5). The resume signal also causes the direction of operation of the second conveyor 320 to be once again reversed so that the direction of operation of the second conveyor 320 is once again in the first direction, A. With the baffle wall 370 back in the first position and the second conveyor 320 moving in the first direction, A, the system 300 is back operating in a normal fashion and oil sand discharged from the first conveyor 310 is eventually moved through the process to be contained in an oil sand slurry. After step 260, method 200 ends.

In this manner, system 300 allows a portion of oil sand containing a piece of metal to be rejected from the system 300 preventing the metal from damaging machinery further downstream in the process.

Figure 7:
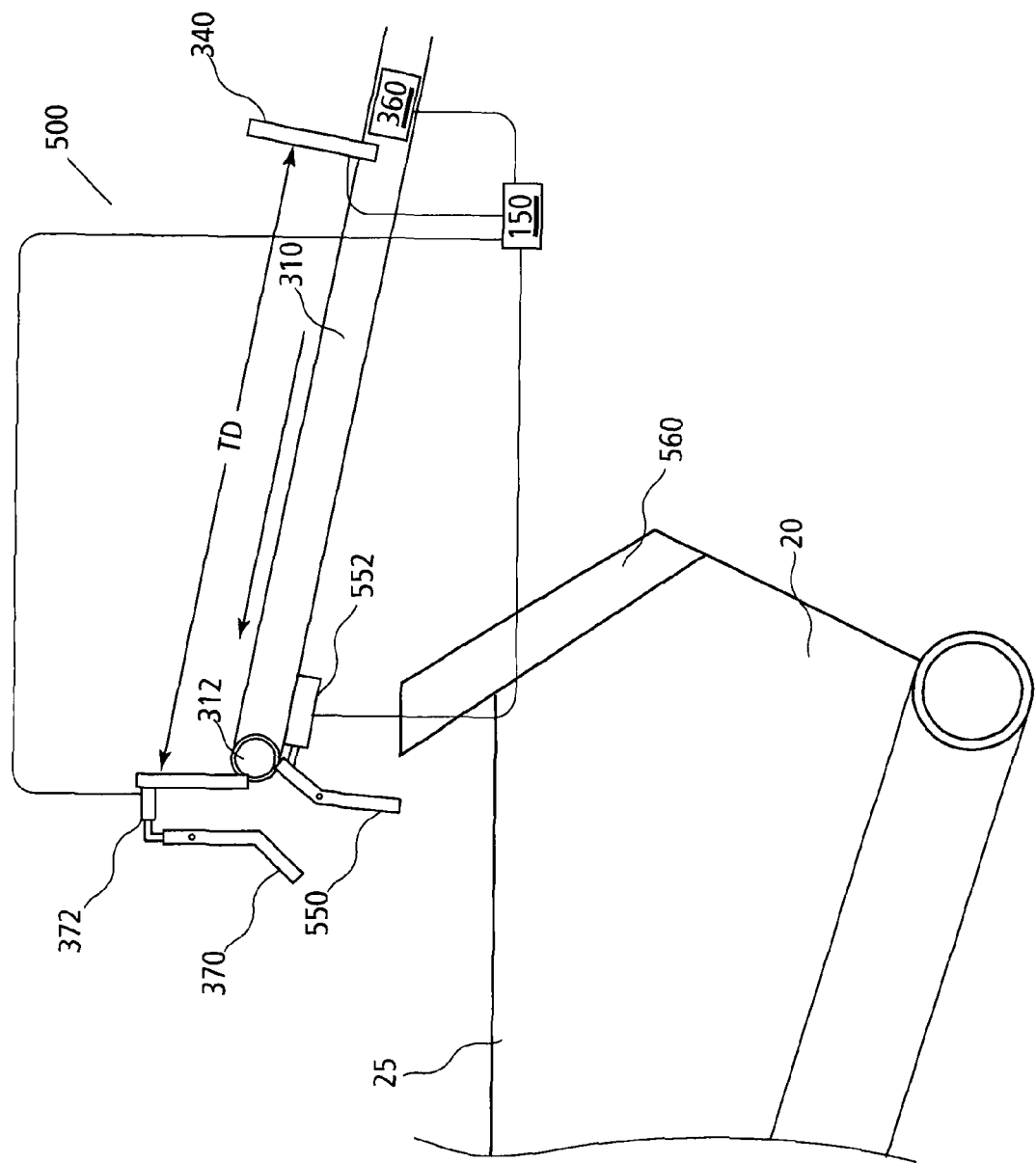
FIG. 7 is a schematic illustration of a system, in a further aspect, for detecting a piece of metal in particulate oil sand carried along a conveyor and rejecting a portion of the particulate oil sand containing the piece of metal, using a baffle wall and chute that operate in conjunction.
Figure 8:
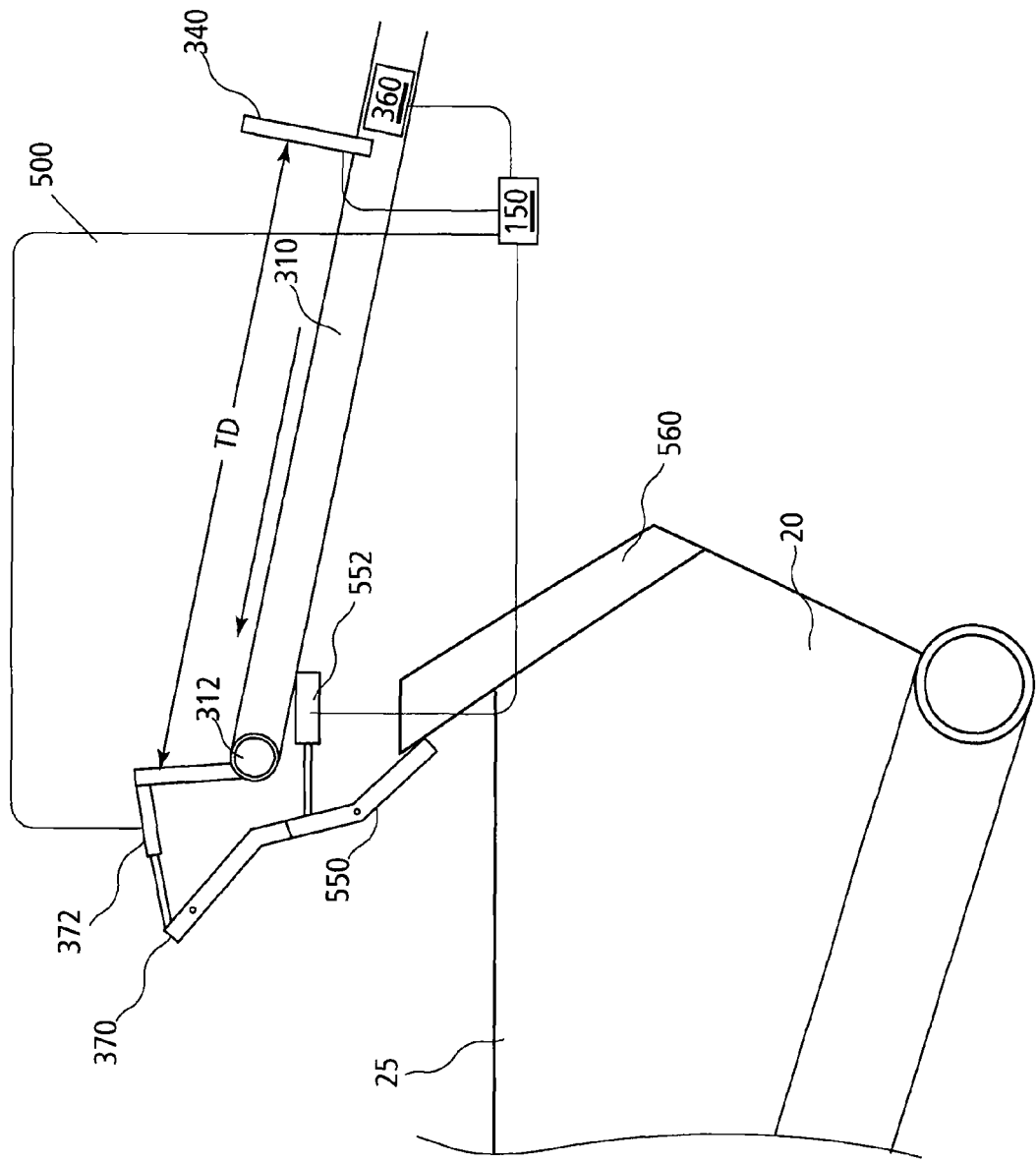
FIG. 8 is schematic illustration of the system of FIG. 7 in a rejection position.

FIGS. 7 and 8 are schematic illustrations of a system 500 in a further aspect. Similar to the system 300 shown in FIGS. 5 and 6, system 500 comprises a first conveyor 310 with a discharge end 312, a baffle wall 370, a metal detector 340, and a controller 150. However, system 500 also contains a first chute 550 and a second chute 560. The use of the first chute 550 in conjunction with the second chute 560 allows the operation of the system 500 without requiring the second conveyor 320 used in system 300 shown in FIGS. 5 and 6.

The first conveyor 310 supplies particulate oil sand to a surge bin 20 with the system 500 discharging particulate oil sand from the first conveyor 310 into an intake opening 25 of the surge bin 20 during normal operation.

The baffle wall 370 is positionable between a first position (shown in FIG. 7), where the baffle wall 370 allows particulate oil sand being discharged from the discharge end 312 of the first conveyor 310 to enter into the intake opening 25 of the surge bin 20 during normal operation of the system 500, and a second position (shown in FIG. 8), with the baffle wall 370 deflecting the discharging particulate oil sand from the first conveyor 310 away from the intake opening 25 of the surge bin 20.

The first chute 550 works in conjunction with the baffle wall 370 and is positionable between a first position and a second position. In the first position (shown in FIG. 7), the first chute 550 is positioned to direct particulate oil sand discharging from the discharge end 312 of the first conveyor 310 into the intake opening 25 of the surge bin 20. In the second position (shown in FIG. 8), the first chute 550 is positioned to receive particulate oil sand deflected by the baffle wall 370 and direct it to the second chute 560. The second chute 560 directs particulate oil sand away from the intake opening 25 of the surge bin 20.

Typically, a first hydraulic cylinder 572 moves the baffle wall 370 between the first position and the second position and a second hydraulic cylinder 552 moves the first chute 550 between the first position and the second position.

The controller 150 is operatively connected to the metal detector 340, the baffle wall 370 (specifically the first hydraulic cylinder 572), the first chute 550 (specifically the second hydraulic cylinder 552) and, optionally, a speed determining device 360. The controller 150 is operatively connected to the metal detector 340 to receive metal detected signals from the metal detector 340 when the metal detector 340 detects a piece of metal passing the metal detector 340 on the first conveyor 310. The controller 150 is operatively connected to the first hydraulic cylinder 572 and the second hydraulic cylinder 552 so that the controller 150 can transmit reject signals and resume signals to the first hydraulic cylinder 572 and the second hydraulic cylinder 552.

In response to a reject signal from the controller 150, the baffle wall 370 is moved from the first position to the second position, directing the flow of particulate oil sand discharging from the discharge end 312 of the first conveyor 310 away from the intake opening 25 of the surge bin 20. The first chute 550 is also moved to the second position in response to a reject signal from the controller 150 and in the second position, the first chute 550 acts in conjunction with the baffle wall 370 to route particulate oil sand away from the intake opening 25 of the surge bin 20.

In response to receiving a resume signal from the controller 150, the baffle wall 370 is moved back to the first position and the first chute 550 is also moved back to the first position (as shown in FIG. 7).

Referring to FIGS. 3, 7 and 8, the controller 150 uses the method 200 illustrated in FIG. 3 to control the operation of the system 500 when a piece of metal is detected by the metal detector 340. The method 200 starts at step 210 when the controller 150 receives a metal detected signal from the metal detector 340 and determines a travel time at step 220 which it then uses to establish a time period for running a first timer at step 230. After the first timer is run at step 230, a reject signal is generated and sent to the baffle wall 370 and the first chute 550 at step 240. A second timer is then run for a discharge time at step 250, before a resume signal is generated and sent to the baffle wall 370 and first chute 550 at step 260. The method 200 then ends.

In this manner, system 500 allows a portion of oil sand containing a piece of metal to be rejected from the system 500 preventing the metal from damaging machinery further downstream in the process.

Figure 9:
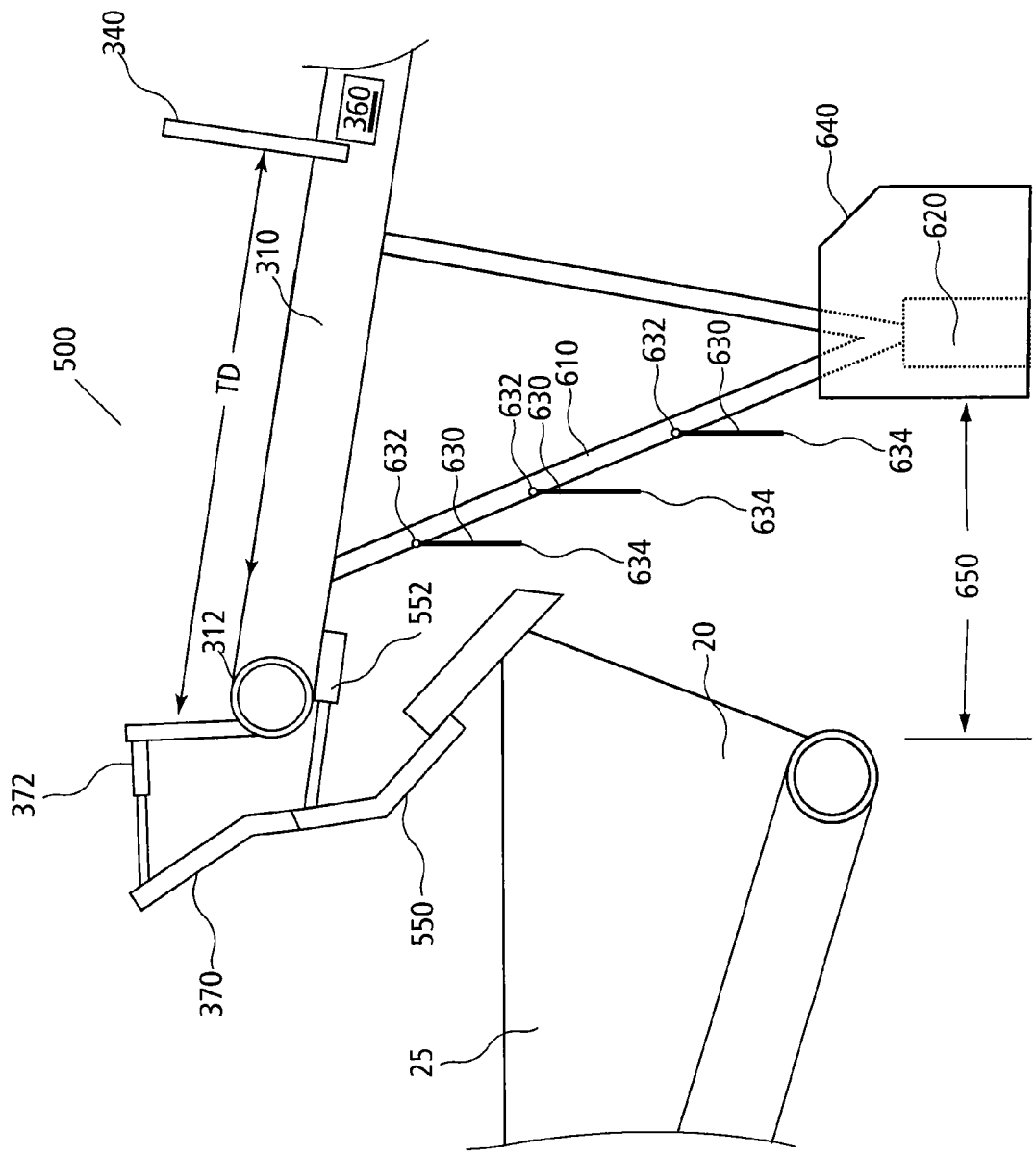
FIG. 9 is a schematic illustration of the system shown in FIGS. 7 and 8 further showing a collection zone where rejected oil sand is directed.

FIG. 9 is a schematic illustration of system the 500, with further components added to address particulate oil sand that is being rejected from the system.

When the particulate oil sand is directed by the second chute 560 away from the intake opening 25 of the surge bin 20, in an aspect, the particulate oil sand may fall towards a support structure 610 that is suspending the discharge end 312 of the first conveyor 310 above the surge bin 20. To protect the support structure 610, a number of flexible baffles 630 are provided attached to the support structure 610. The flexible baffles 630 are typically made of a heavy material, such as rubber, and are attached at a top end 632 to the support structure 610, with a bottom end 634 of the flexible baffles 630 freely hanging to absorb the force of any falling particulate material striking the flexible baffles 630.

A foundation 620 of the support structure 620 can be at least partially surrounded by a protecting wall 640 to protect the foundation 620 from falling particulate material.

A collection zone 650 may be provided where the falling particulate matter collects, with the collection zone 650 fenced off in one aspect to prevent workers or other people from entering the collection zone 650 and possibly being struck by rejected oil sand.

Figure 10:
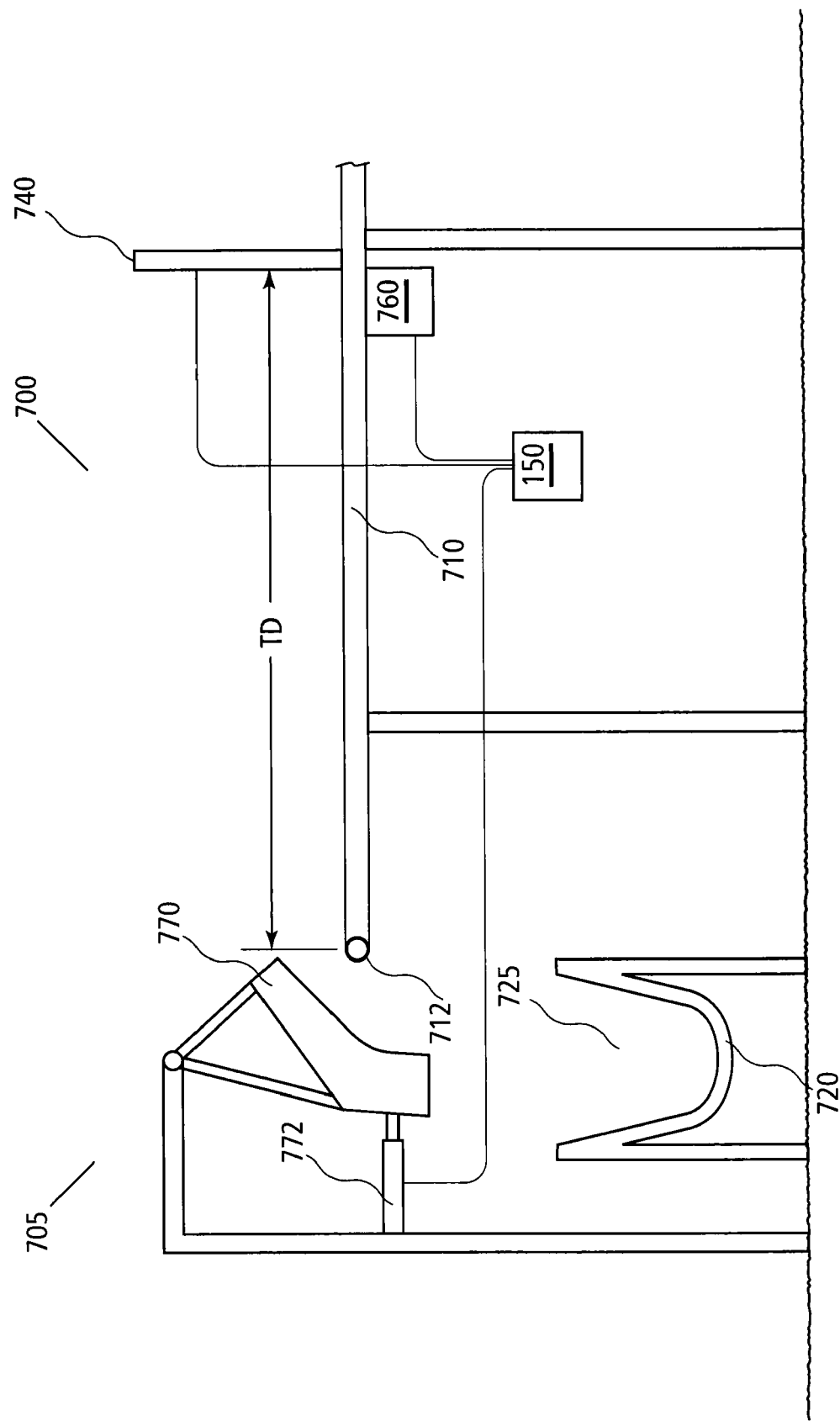
FIG. 10 is a schematic illustration of a system, in a further aspect, for detecting a piece of metal in particulate oil sand carried along a conveyor and rejecting a portion of the particulate oil sand containing the piece of metal, using a baffle wall.
Figure 11:
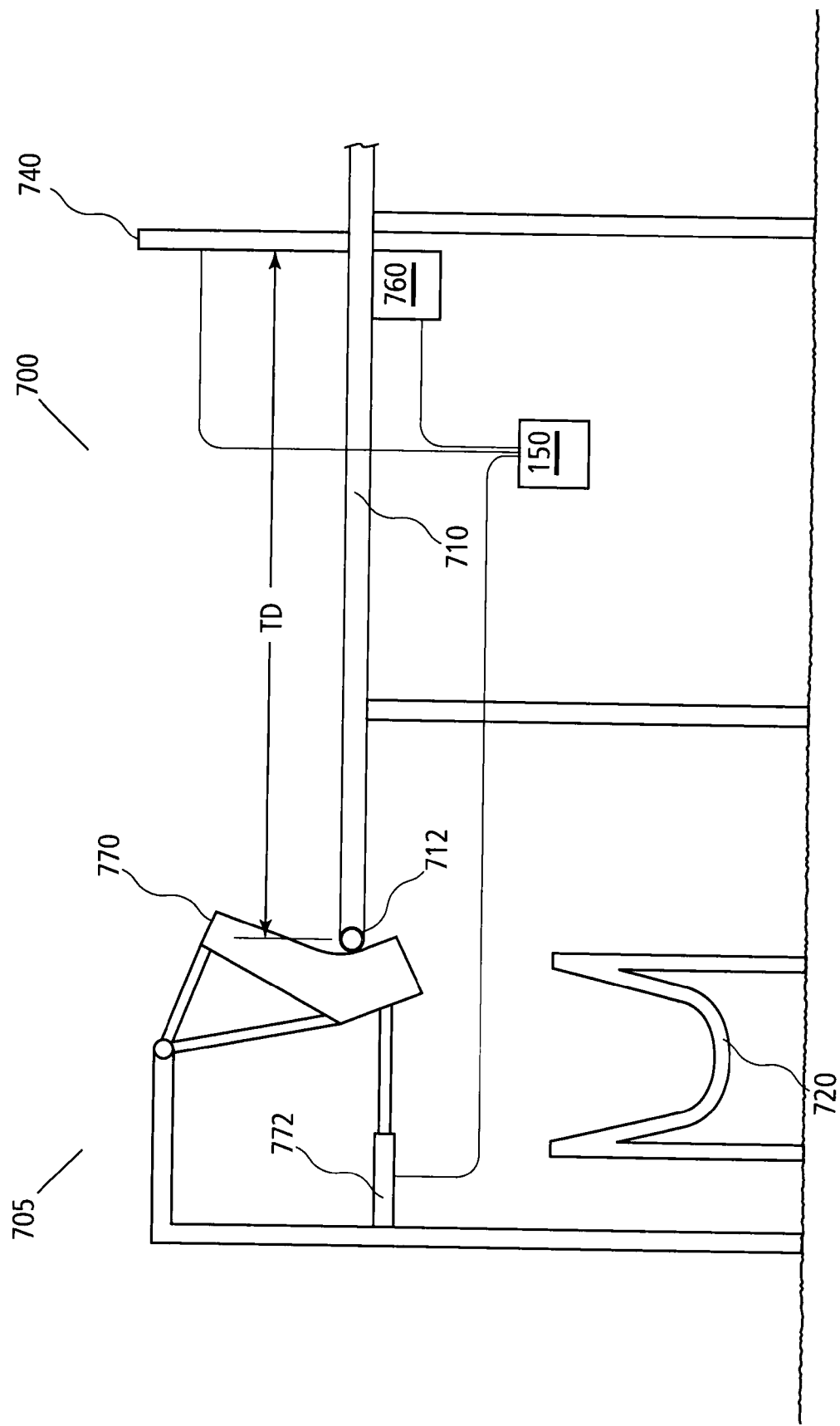
FIG. 11 is schematic illustration of the system of FIG. 10 in a rejection position.

In some cases, it may be desirable to reject a portion or particulate oil sand containing a piece of metal from a conveyor that does not end in either a surge bin or with a slurry preparation plant. In some cases it may be desirable to reject a portion of particulate oil sand containing a piece of metal from a transfer point between two different conveyors. FIGS. 10 and 11 illustrate a system 700 for rejecting a portion of particulate oil sand, containing a piece of metal, traveling along a first conveyor 710, instead of transferring the portion of particulate oil sand to a second conveyor 720.

A redirection device 705 is provided that includes a baffle wall 770 and a hydraulic cylinder 772. The baffle wall 770 is provided at a discharge end 712 of the first conveyor 710. The baffle wall 770 is positionable between a first position, where the baffle wall 770 allows particulate oil sand being discharged from the discharge end 712 of the first conveyor 710 to enter an intake opening 725 of the second conveyor 720 (as shown in FIG. 10) and a second position, where the baffle wall 770 deflects particulate oil sand discharging from the discharge end 712 of the first conveyor 710 away from the intake opening 725 of the second conveyor 720 (as shown in FIG. 11).

A metal detector 740 is provided along the first conveyor 710, a travel distance, TD, from the discharge end 712 of the first conveyor 710. The metal detector 740 is operative to sense a piece of metal in particulate oil sand passing by the metal detector 740 along the first conveyor 710.

A controller 150 is operatively connected to the metal detector 740, the hydraulic cylinder 772 and optionally a speed sensor 760, operative to determine the speed of the first conveyor 710 if the controller 150 is not connected to the system controlling the operation of the first conveyor 710.

The controller 150 is operatively connected to the metal detector 740, the baffle wall 770 (specifically the hydraulic cylinder 772) and optionally, a speed determining device 760. The controller 150 is operatively connected to the metal detector 740 to receive metal detected signals from the metal detector 740 when the metal detector 740 detects a piece of metal passing the metal detector 740 on the first conveyor 710. The controller 150 is operatively connected to the hydraulic cylinder 772 so that the controller 150 can transmit reject signals and resume signals to the hydraulic cylinder 772.

In response to a reject signal from the controller 150, the baffle wall 770 is moved from the first position to the second position (as shown in FIG. 11), directing the flow of particulate oil sand discharging from the discharge end 712 of the first conveyor 710 away from the intake opening 725 of the second conveyor 720. In response to a resume signal from the controller 150, the baffle wall 770 is moved back to the first position (as shown in FIG. 8).

Referring to FIGS. 3, 10 and 11, the controller 150 uses the method 200 illustrated in FIG. 3 to control the operation of the system 700 when a piece of metal is detected by the metal detector 740. The method 200 starts at step 210 when the controller 150 receives a metal detected signal from the metal detector 740 and determines a travel time at step 220 which it then uses to establish a time period for running a first timer at step 230. After the first timer is run at step 230, a reject signal is generated and sent to the baffle wall 770 at step 240. A second timer is then run for a discharge time at step 250, before a resume signal is generated and sent to the baffle wall 770 at step 260. The method 200 then ends.

In this manner, system 700 allows a portion of oil sand containing a piece of metal to be rejected from the system 700 preventing the metal from damaging machinery further downstream in the process.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A system for rejecting a portion of non-metallic particulate material containing a piece of tramp metal, the system comprising:

a first conveyor having a discharge end, the discharge end positioned to discharge particulate material from the first conveyor to an intake opening;

a metal detector positioned adjacent to the first conveyor and upstream a travel distance from the discharge end;

a redirection device provided at the discharge end of the first conveyor, the redirection device comprising a second conveyor positioned so that particulate material discharged from the discharge end of the first conveyor is deposited onto the second conveyor, the second conveyer having a first end positioned over the intake opening and a second end positioned away from the intake opening, the second conveyor further being bidirectional such that the second conveyor operates in a first direction to direct the particulate material into the intake opening and in a second direction to direct the particular material away from the intake opening; and a controller comprising at least one processor, the at least one processor operative to:

in response to receiving a metal detected signal from the metal detector, the metal detected signal indicating that the metal detector has detected a piece of tramp metal in the particulate material traveling along the first conveyor, determine a travel time for the piece of tramp metal to reach the discharge end of the first conveyor; and activate the redirection device so that the second conveyer operates in the second direction to redirect particulate material discharged from the discharge end of the first conveyor away from the intake opening at the travel time.

2. The system of claim 1 wherein the at least one processor determines the travel time based on the travel distance and a speed of operation of the first conveyor.

3. The system of claim 2 wherein the speed of operation of the first conveyor is obtained by the controller from a speed sensing device.

4. The system of claim 1 wherein the at least one processor activates the redirection device for a discharge time by transmitting a reject signal to the redirection device before the travel time, the reject signal causing the redirection device to redirect particulate material discharged from the discharge end of the first conveyor away from the intake opening and then waiting the discharge time after the reject signal is transmitted before transmitting a resume signal to the redirection device, the redirection device, in response to the resume signal, allowing particulate matter discharging from the first conveyor to enter the intake opening.

5. The system of claim 1 wherein the intake opening is an opening of a slurry preparation tower.

6. The system of claim 1 wherein the intake opening is an opening of a surge bin.

7. A method for rejecting a portion of non-metallic particulate material containing a piece of tramp metal traveling along a first conveyor discharging, the method comprising:
    detecting a piece of tramp metal in particulate material carried by the first conveyor;
    determining a travel time indicating when the piece of tramp metal will be discharged from the first conveyor to a second conveyer having a first end positioned over an intake opening and a second end positioned away from the intake opening, the second conveyor further being bidirectional such that the second conveyor operates in a first direction to direct particulate material into the intake opening and in a second direction to direct particular material away from the intake opening; and
    directing particulate material discharged to the second conveyer away from the intake opening for a discharge time by operating the second conveyer in the second direction and then redirecting the particulate matter being discharged from the first conveyor to the second conveyor towards the intake opening after the discharge time by operating the second conveyor in the first direction,
    wherein the travel time occurs within the discharge time.

8. The method of claim 7 wherein the first conveyor is operated at a substantially constant speed.

9. The method of claim 7 wherein the first conveyor is operating at a first speed when the piece of tramp metal is detected and the first conveyor is operated at least the first speed during the method.

10. The method of claim 7 wherein the discharge time is less than 60 seconds.

11. The method of claim 7 wherein the discharge time is less than 30 seconds.

12. The method of claim 7 wherein the discharge time is between 5 seconds and 30 seconds.

13. The method of claim 7 wherein the discharge time period is between 8 seconds and 15 seconds.

* * * * *